United States Patent [19]

Duxbury et al.

[11] Patent Number: 4,773,067
[45] Date of Patent: Sep. 20, 1988

[54] MULTI-NODE DATA PROCESSING SYSTEM

[75] Inventors: Colin M. Duxbury, Stockport; Raymond Yates, Manchester, both of Great Britain

[73] Assignee: International Computers Limited, London, England

[21] Appl. No.: 921,211

[22] Filed: Oct. 20, 1986

[30] Foreign Application Priority Data

Nov. 23, 1985 [GB] United Kingdom ............... 8528892

[51] Int. Cl.$^4$ .......................... H04J 3/26; H04J 3/14
[52] U.S. Cl. .................................... 370/94; 364/200; 370/85
[58] Field of Search ...................... 340/825.01, 825.03, 340/825.04, 825.05, 825.5, 825.51; 370/53, 54, 86, 87, 88, 89, 1, 4, 85, 94; 364/200 MS File, 900 MS File

[56] References Cited

U.S. PATENT DOCUMENTS

| | | | |
|---|---|---|---|
| 4,007,450 | 2/1977 | Haibt et al. | 364/200 |
| 4,190,821 | 2/1980 | Woodward | 370/88 |
| 4,271,511 | 6/1981 | Manber et al. | 340/825.01 |
| 4,276,643 | 6/1981 | Laprie et al. | 340/825.51 |
| 4,347,498 | 8/1982 | Lee et al. | 340/825.5 |
| 4,354,226 | 10/1982 | Flickinger et al. | 364/200 |
| 4,430,700 | 2/1984 | Chadima, Jr. et al. | 364/200 |
| 4,434,463 | 2/1984 | Quinquis et al. | 364/200 |
| 4,475,188 | 10/1984 | Wilson et al. | 340/825.04 |
| 4,484,325 | 11/1984 | Wilson et al. | 340/825.04 |
| 4,488,151 | 12/1984 | Bolton et al. | 340/825.5 |
| 4,550,397 | 10/1985 | Turner et al. | 370/94 |
| 4,562,539 | 12/1985 | Vince | 364/200 |
| 4,583,089 | 4/1986 | Cope | 370/85 |
| 4,713,807 | 12/1987 | Caves et al. | 370/94 |
| 4,716,408 | 12/1987 | O'Connor et al. | 340/825.5 |
| 4,740,958 | 4/1988 | Duxbury et al. | 370/94 |

Primary Examiner—Gareth D. Shaw
Assistant Examiner—Joseph T. Fitzgerald
Attorney, Agent, or Firm—Lee & Smith

[57] ABSTRACT

A multi-node data processing system is described in which each node (10-13) includes a processor (PROC) and an inter-node switch (INS). In operation, only one INS is active. The active INS is configured to act as a star coupler, receiving messages from any of the nodes and broadcasting each message to all the nodes including the node in which that INS is located. Each non-active INS is configured to route messages from the local processor to the active INS, and to route incoming messages broadcast by the active INS to the local processor. The system can be reconfigured to make a different INS active.

7 Claims, 9 Drawing Sheets

MULTI-NODE DATA PROCESSING SYSTEM

This invention relates to multi-node data processing systems, and in particular is concerned with the way in which the individual nodes in such a system are interconnected so as to allow transfer of messages between them.

One way of interconnecting data processing nodes is to use a central switch or star coupler which is connected to each node by means of a separate path. The central switch receives messages from any one of the nodes, and broadcasts each message to all the nodes (including the node that originated the message).

A problem with the use of such a central switch, however, is that if it fails the nodes are no longer able to communicate with each other and hence the whole system may become inoperable. Greater fault tolerance may be achieved by duplicating the central switch, with one switch acting as a stand-by in case the other fails. However, this requires further switching logic for selecting which of the central switches is to be the currently active switch and which is to be the stand-by and this switching logic is itself liable to failure, as are the physical node interconnections.

The object of the present invention is to provide an improved way of interconnecting the nodes which does not suffer from the above problems.

SUMMARY OF THE INVENTION

According to the present invention there is provided a data processing system comprising a plurality of data processing nodes each node including a data processing unit characterised in that each node also includes a switching unit, wherein in operation the switching unit in any one of the nodes can be selected to act as a star coupler for receiving messages from any of the nodes and broadcasting each message to all the nodes, the switching unit in each other node acting to relay messages between the processor in that node and the selected switching unit.

One embodiment of the invention will now be described by way of example with reference to the accompanying drawings.

DESCRIPTION OF AN EMBODIMENT OF THE INVENTION

Figure 1:
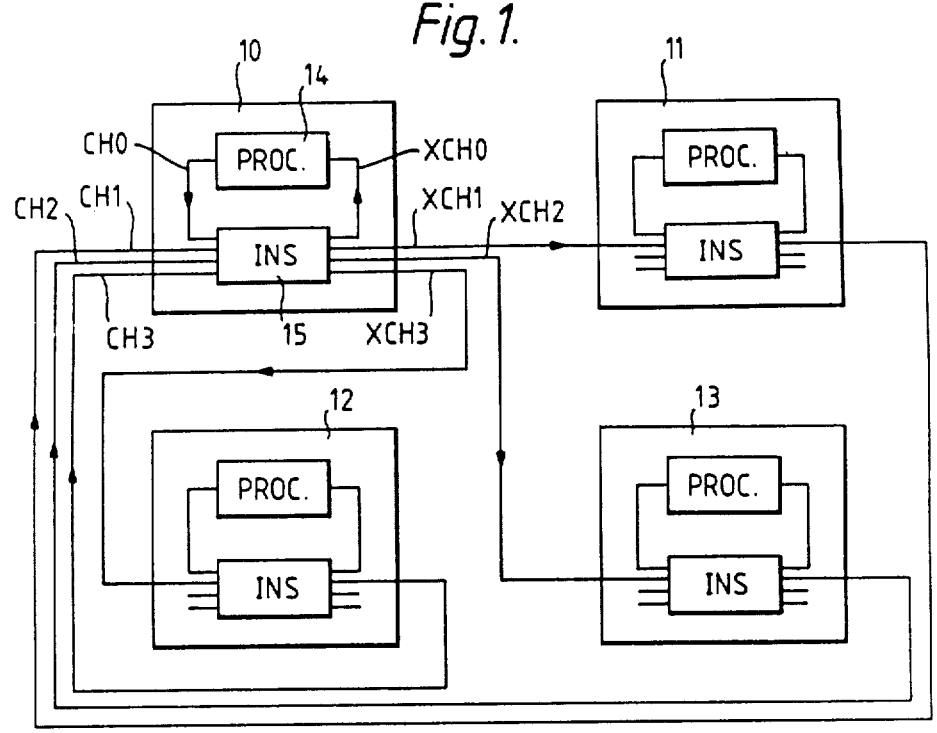
FIG. 1 shows a multi-node data processing system.

FIG. 1 shows a multi-processor data processing system comprising four processing nodes 10-13. Each node comprises a data processor 14 and an inter-node switch (INS) 15. The inter-node switch has four channels (channels 0-3) each of which has a data input path (CH0-CH3) and a data output path (XCH0-XCH3). Channel 0 is connected to the local processor (i.e. the processor 14 in the same node), while the other three channels are connected to the other nodes. For simplicity, only the connections to node 10 are shown in the drawing, and it will be appreciated that the other nodes are connected in a similar manner.

Each of the inter-node connections shown in FIG. 1 consists of a bundle of six optical fibres. Each fibre carries a Manchester-encoded signal at a rate of 80 Mbits/second. Manchester coding is a well known technique for providing a self-clocked signal carrying both clock and data information.

Five of the fibres carry a data digit consisting of four data bits and an associated parity bit. A message consists of 32 consecutive digits, preceded by a six-bit start pattern 111101 on each fibre, and followed by a two-bit end pattern 00 on each fibre. When no message is being sent, a synchronisation pattern 1000 is transmitted repeatedly on each fibre.

The sixth fibre carries an acknowledgement signal ACK in the reverse direction. The purpose of this will be explained later. The acknowledgement fibre normally carries the synchronisation pattern 1000, an ACK signal being represented by inverting this pattern once, i.e. —1000 0111 1000—.

At any given time, only one of the inter-node switches is active. This active INS acts as a star coupler, receiving messages from all the nodes (including the node in which the INS is located) and broadcasting each message to all the nodes in parallel. The other inter-node switches serve merely to route messages from the local processor to the node that contains the active INS, and to route incoming messages from the active INS to the local processor. The node that contains the currently active INS is said to be in local mode, while the other nodes are said to be in remote mode.

Figure 2:
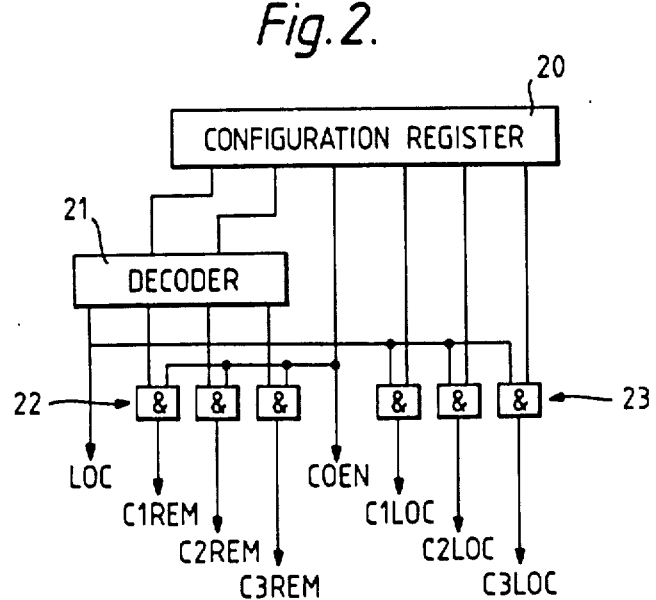
FIG. 2 shows a configuration register in one node.

Referring to FIG. 2, each node contains a six-bit configuration register 20. The third bit of this register COEN enables channel 0, allowing the local processor to transmit to and receive from the INS (whether the INS is local or remote). The first two bits of the configuration register 20 are decoded by a 2:4 decoder 21. The first output of the decoder 21 provides a control signal LOC which indicates that this node contains the active INS; i.e. it is in local mode. The other three outputs of the decoder 21 are combined with COEN in AND gates 22 to produce control signals C1REM, C2REM or C3REM indicating that this node is in remote mode and that the active INS is in the node connected to channel 1,2 or 3.

The other three bits of the configuration register are combined in AND gates 23 with the LOC signal to produce signals C1LOC, C2LOC and C3LOC. These signals enable the three channels 1-3 when the node is in local mode.

Figure 3:
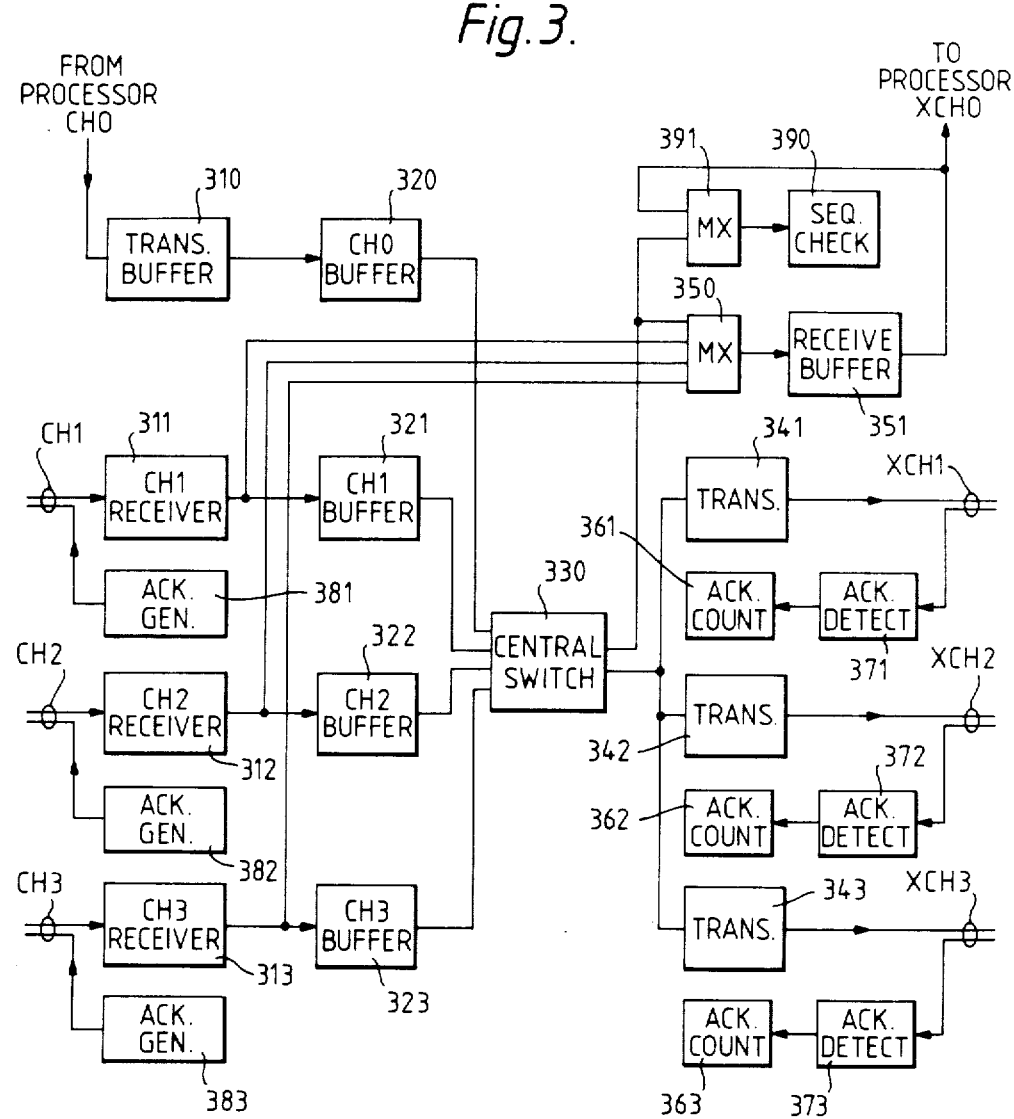
FIG. 3 shows an inter-node switch (INS) in one node.

Referring now to FIG. 3, this shows one of the inter-node switches INS in more detail. Messages from the local processor are received over input path CH0 and are assembled in a transmission buffer 310. Messages from the other three input paths CH1-CH3 are received by respective receivers 311-313. The outputs of the transmission buffer 310 and the three receivers 311-313 are fed to respective channel buffers 320-323. Each of these channel buffers acts as a first-in-first-out queue holding up to 128 messages waiting to be transmitted.

The outputs of the channel buffers are fed to a central switch 330. This switch selects the channels one at a time, and reads out a message from the selected channel. This message is fed to three transmitters 341-343 which convert the signals into optical signals and transmit them over the output paths XCH1-XCH3.

The output of the switch 330 is also fed to one input 5 of a 4:1 multiplexer 350, the other three inputs of which are connected to the receivers 311-313. The multiplexer 350 is controlled by the first two bits of the configuration register 20, so that when the INS is in local mode, the multiplexer 350 selects the output of the central switch 330 and when the INS is in remote mode the multiplexer 350 selects the output of the receiver that is receiving data from the active INS. The output of the multiplexer 350 is fed to a receive buffer 351. This is a first-in-first-out buffer and holds a queue of up to 256 messages waiting to be read by the local processor.

The overall operation of the INS will now be described. This depends on whether it is in local or remote mode.

In local mode, all the channel buffers are normally enabled, and receive messages from the four nodes. Whenever one of the channel buffers has a message ready for transmission, it sends a request to the central switch 330. The central switch selects one of the requesting channels, and reads out a message from the channel buffer. This message is sent to the receive buffer 351 by way of the multiplexer 350, and can then be read by the local processor. The message is also broadcast to the other nodes over the output paths XCH1-XCH3.

In remote mode, only the channel 0 buffer 320 is enabled; the other three are all disabled. The multiplexer 350 is switched to select messages from the node containing the active INS. Since channel buffers 321-323 are disabled, only channel 0 sends requests to the central switch 330, and so that channel is permanently selected by the switch. Messages from the local processor are therefore transmitted over all the output paths XCH1-XCH3 to all the other nodes, and in particular to the node containing the currently active INS. The active INS will then operate, as described above, to broadcast each message to all the nodes, including the one that originated the message. Thus, in remote mode, the INS serves simply to relay messages from the local processor to the node containing the active INS, and to route messages received from the active INS to the receive buffer 351 and hence to the local processor.

It will be appreciated that the system can be reconfigured if required so as to change the active INS to a different node, e.g. if the active INS develops a fault, or if a cable between a remote node and the active INS becomes faulty. This is done by adjusting the values of the configuration registers in the nodes. Also, one or more of the nodes may be omitted, by suitable adjustment of the configuration registers in the remaining nodes to disable those channels that are not required.

Referring still to FIG. 3, the INS contains three acknowledgement (ACK) counters 361-363, one for each of channels 1-3. Whenever a message is transmitted over the output paths XCH1-XCH3 of these channels, all three counters are incremented by one. Each channel also has an ACK detection circuit 371-373 for detecting ACK signals from the respective paths XCH1-XCH3. When an ACK signal is detected, the corresponding counter is decremented by one.

Each of the channels 1-3 also has an ACK generation circuit 381-383 for sending ACK signals over the respective paths CH1-CH3. In local mode, each of these circuits produces an ACK signal whenever a message is read out of the channel buffer of the associated channel. In remote mode, only one of the AK generation circuits is active, namely the one belonging to the channel connected to the active INS. In this case, the ACK generator circuit produces an ACK signal whenever a message is read out of the receive buffer 351.

It can be seen that each of the ACK counters 361-363 keeps a count of the number of messages waiting in the channel buffer (or receive buffer) at the other end of the associated channel. The count is only approximate, since it does not allow for messages in transit between the nodes. Nevertheless, the ACK counts are useful as an indication of how full the buffers are, and are used, as will be described, to control the rate of transmission of messages so as to ensure that the buffers do not overflow.

Each message contains a source node number and a sequence number which are inserted into the message by the processor which originally generated the message. The source node number indicates the identity of the node in which the message originated, while the sequence numbers indicate the sequence in which the messages are generated by the node.

Tne sequence numbers are checked in the INS by a sequence checking circuit 390. This receives messages from a 2:1 multiplexer 391, controlled by the signal LOC derived from the configuration register. When LOC is true (i.e. the node is in local mode) the multiplexer 391 selects the output of the central switch 330. When LOC is false (i.e. the node is remote mode) it selects the output of the receive buffer 351.

The sequence checking circuit 390 holds a sequence count for each node. Whenever it receives a message, it uses the source node number in that message to select the appropriate sequence count, and then compares the selected count with the sequence number of the message. Any discrepancy indicates a transmission error in the system.

Figure 4:
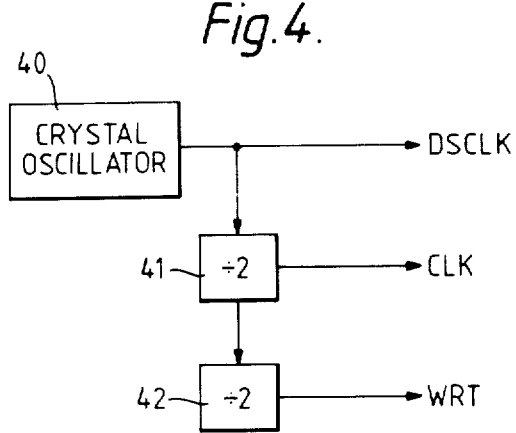
FIG. 4 shows the way in which internal clocks are generated for the INS.

Referring now to FIG. 4, the timing of the INS is controlled by a crystal oscillator 40, running at 80 MHz. The output of the oscillator is divided by two, by means of a circuit 41, to produce a 40 MHz clock signal CLK for the INS. The output of the oscillator also directly provides a double speed clocksignal DSCLK.

The clock signal CLK is divided by two by means of a circuit 42 to produce a write control signal WRT. This signal divides the operation of the INS into alternate read and write cycles, consisting of alternate cycles of the clock CLK. When WRT is true (i.e. in a write cycle) the various buffers 320-323, 351 can be written to; when WRT is false, they can be read.

Figure 5:
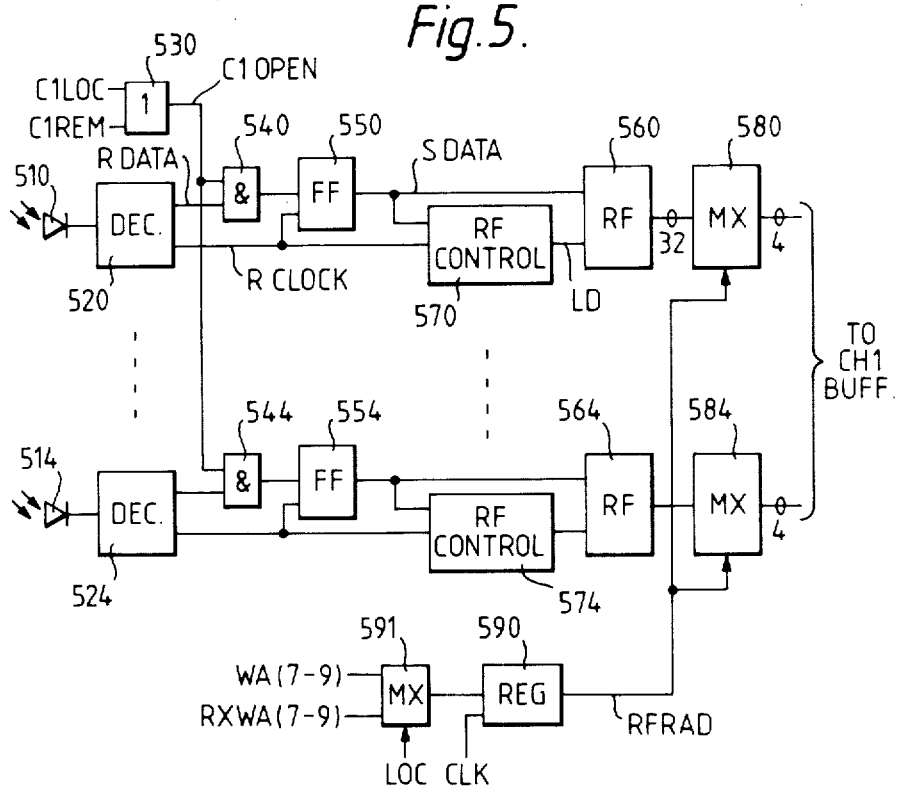
FIGS. 5-7 show one of the receivers forming part of the INS.

Referring now to FIG. 5, this shows the channel 1 receiver 311 in more detail. The other receivers 312, 313 are similar.

As mentioned above, each input path CH1-CH3 consists of six optical fibres, five of which carry an incoming data digit. The signals on these five incoming fibres are converted to electrical signals by photodiodes 510-514. The outputs of the photodiodes are fed to decoders 520-524, each of which produces a received data signal RDATA and corresponding clock signal RCLOCK derived from the incoming signal.

The clocks RCLOCK have a nominal frequency of 80MHz. However, they are not synchronised to the internal clock DSCLK of the INS. Moreover, because of variations in the length and refractive index of the fibres, the clock signals RCLOCK from the five fibres may be skewed relative to each other, i.e. the five bits of each digit do not necessarily arrive at the same time on all five fibres.

The receiver 311 is enabled by means of a signal C1OPEN produced by an OR gate 530 which receives C1LOC and C1REM, derived from the configuration register. C1OPEN therefore denotes that channel 1 is enabled either in local or remote mode. In the case of the other receivers 312, 313 the corresponding signals for channels 2 and 3 are used.

C1OPEN enables a set of five AND gates 540-544 to accept the data signals RDATA from the decoders. The outputs of the AND gates are clocked into flip-flops 550-554 by means of the clock signal RCLOCK, to produce staticised data signals SDATA. The signals SDATA are fed to the inputs of five 32-bits register files 560-564.

Each register file has an associated control circuit 570-574, which receives both the data SDATA and the clock RCLOCK. Each of these control circuits detects the message start pattern 111101 in the incoming data, and then enables each of a set of 32 load control lines LD in turn, so as to load the next 32 data bits into the 32 locations of the register file.

The data outputs of the register files 560-564 are connected to respective 8:1 multiplexers 580-584. These multiplexers are controlled by a common 3-bit read address RFRAD from a register 590. Each value of the read address selects a group of four adjacent bit locations from each of the five register files, so as to produce a 20-bit parallel data output consisting of a group of four consecutive digits (including both data and parity bits). This output is supplied, as shown in FIG. 3, to the corresponding channel buffer and also to the receive buffer 351 by way of the multiplexer 350.

The address RFAD is obtained from a 2:1 multiplexer 591 controlled by the signal LOC derived from the configuration register. When LOC is true (local mode) the multiplexer selects a 3-bit address WA(7-9) from the corresponding channel buffer 321. When LOC is false (remote mode) it selects a corresponding 3-bit address RXWA(7-9) from the receive buffer 351.

As will be described later, these addresses WA and RXWA are incremented during each write cycle of the internal clock CLK. Hence, it can be seen that, while data is loaded into the register files asynchronously under the control of the received clocks RCLOCK, it is read out synchronously in step with the internal clock CLK.

Figure 6:
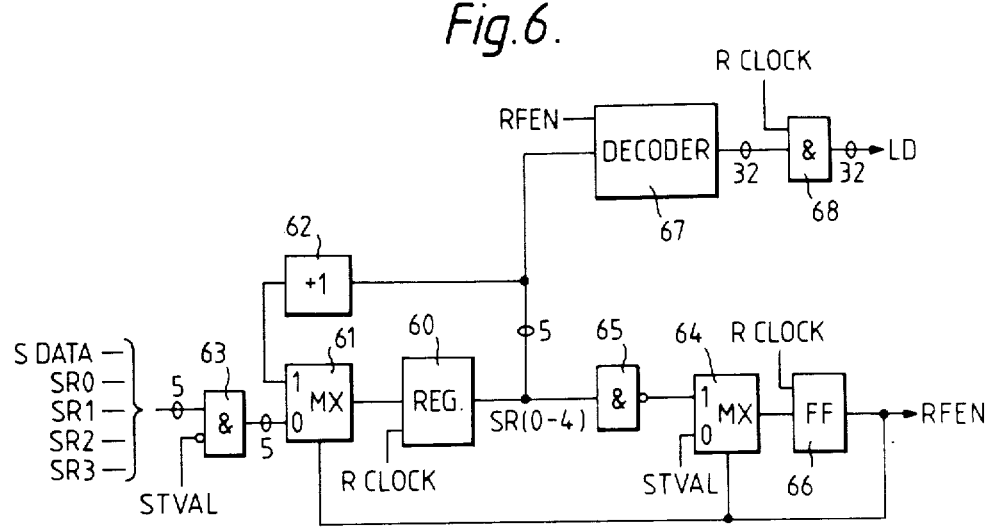
Figure 7:
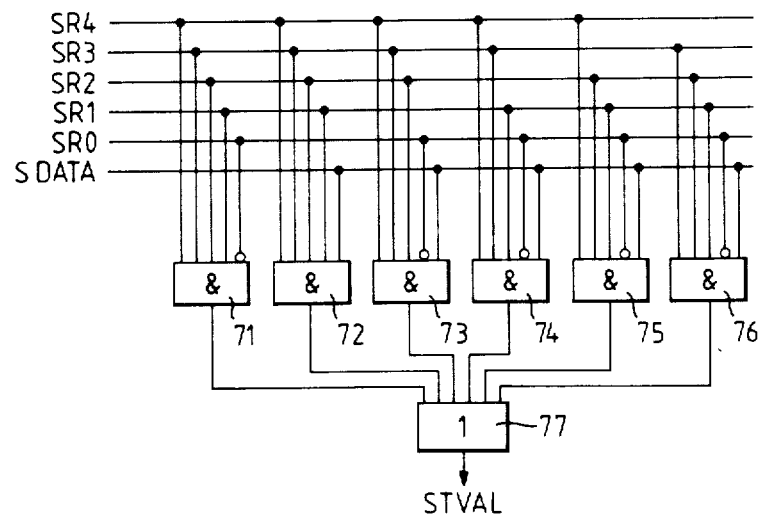

FIGS. 6 and 7 show one of the register file control circuits 570-574 in detail.

Referring to FIG. 6, the control circuit comprises a register 60 holding five bits SR0-SR4. The register is clocked by the received clock signal RCLOCK. The input to the register comes from a 2:1 multiplexer 61 controlled by a control signal RFEN. When RFEN is true, the multiplexer selects the output of an incrementer circuit 62 which increments the current contents of the register 60 by one. When RFEN is false, it selects the output of a set of AND gates 63, controlled by the inverse of a signal STVAL. The AND gates receive a five-bit input consisting of the current input data bit SDATA and the four most significant bits SR0-SR3 of the register 60.

The signal RFEN also controls a multiplexer 64. When RFEN is true, the multiplexer selects the output of a NAND gate 65, which receives the outputs of the register 60. When RFEN is false, it selects the signal STVAL. The output of the multiplexer 64 is clocked into a flip-flop 66 by RCLOCK, and provides the control signal RFEN.

The signal RFEN also enables a 5:32 decoder 67 which decodes the current contents of the register 60 to produce a signal on one of 32 output lines. These output lines are combined in a set of AND gates 68 with the clock RCLOCK, to provide the 32 load control signals LD for the corresponding register file.

In operation, RFEN and STVAL are initially false. Thus, at each beat of RCLOCK, bits SR0-SR3 of the register 60 are re-loaded into bit positions SR1-SR4 via the AND gates 63 and the multiplexer 61, while at the same time the current input data bit SDATA is loaded into bit position SR0. Thus, in this case, the register 60 acts as a shift register, into which data is shifted serially from the SDATA input. The register 60 thus holds the five most recent bits of SDATA.

Referring now to FIG. 7, the contents SR0-SR4 of the register 60, and the current data input bit SDATA are fed to a detector circuit consisting of six AND gates 71-76 and an OR gate 77, the output of which is the signal STVAL. It can be seen that each of the AND gates 71-76 is enabled if a particular group of five out of the six bits SDATA, SR0-SR4 matches the six bit start pattern 111101, so that STVAL is produced if any five out of the six bits match. Thus, the circuit detects the start pattern at the correct time even if one bit of the pattern is corrupted. It will also correctly detect the start pattern if one bit of the preceding synchronisation pattern 1000 is corrupted.

Referring again to FIG. 6, when the start pattern is detected, STVAL inhibits the AND gates 63. Thus, at the next RCLOCK beat, the register 60 is reset to zero. STVAL also causes the flip-flop 66 to be set, making RFEN true. This switches the multiplexers 61, 64 and enables the decoder 67.

The register 60 is now incremented by one at each RCLOCK beat and therefore counts up from 00000 to 11111 (i.e. decimal 0-31). This causes each of the load control lines LD to be activated in turn, causing the next 32 bits of the data signal SDATA to be loaded into respective bit positions of the associated register file. When the count reaches 11111, the NAND gate 65 is disabled, and this resets the flip-flop 66, making RFEN false again. This puts the register 60 back into the shift register mode, to look for the next start pattern.

Figure 8:
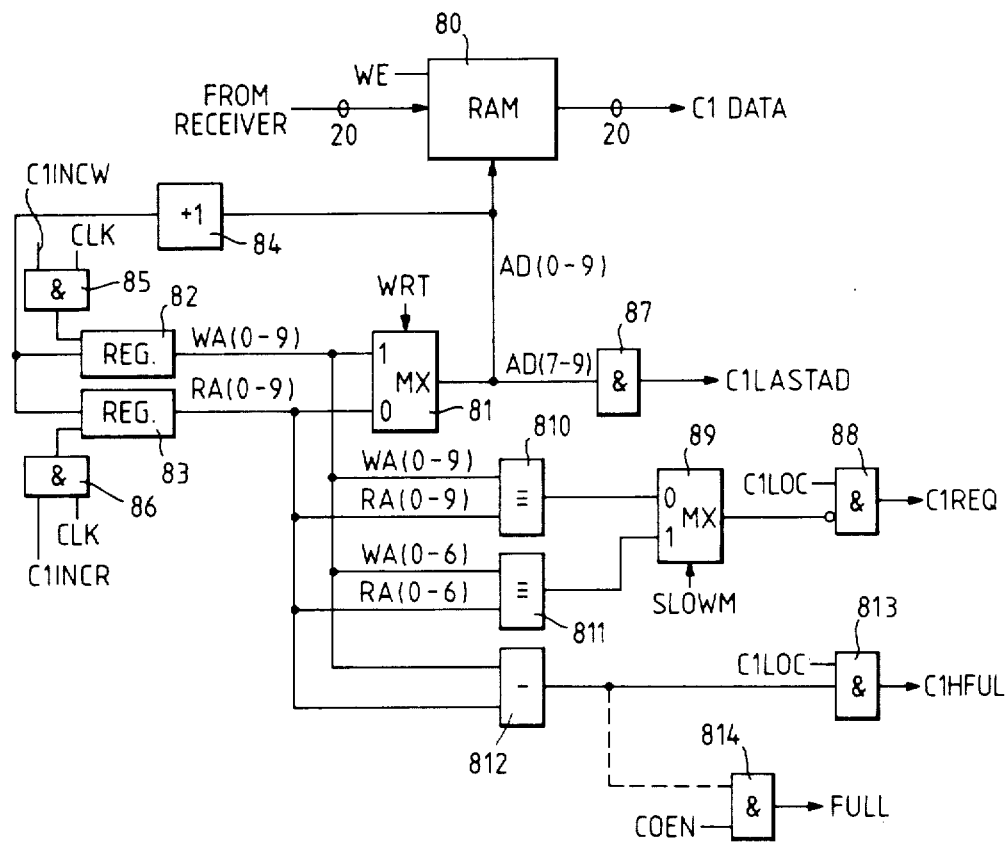
FIGS. 8 and 9 show one of the channel buffers forming part of the INS.
Figure 9:
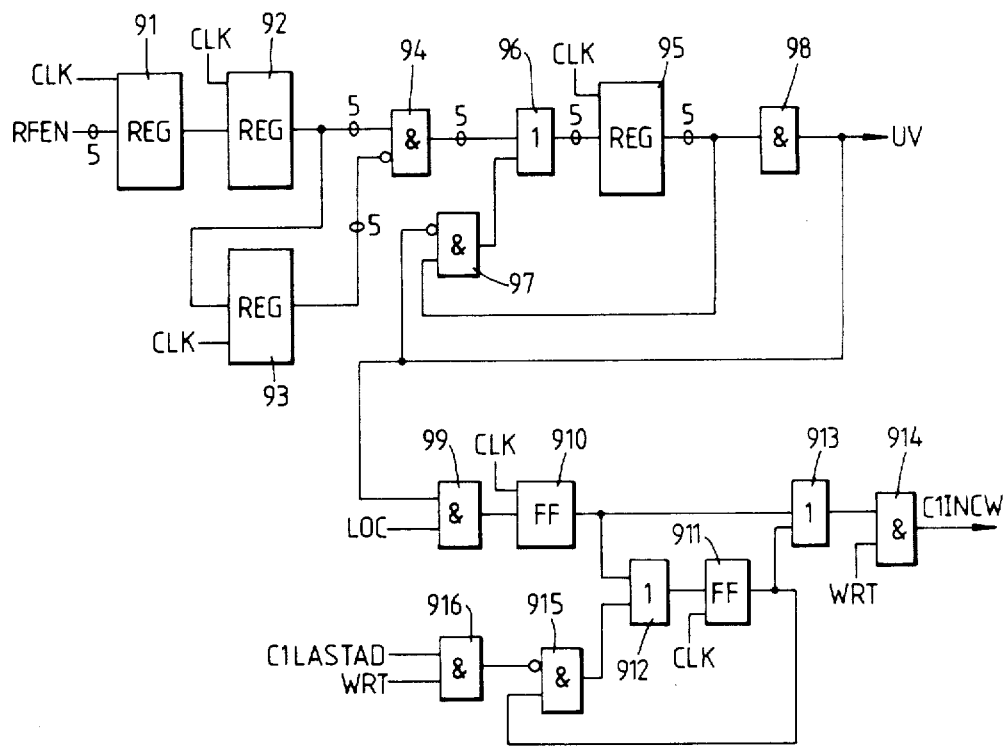

FIGS. 8 and 9 show the channel buffer 321 for channel 1 in detail. The buffers for the other channels are similar.

Referring to FIG. 8, the channel buffer comprises a 1K×20 RAM 80 which receives the data signal from the associated receiver 311. The RAM has a write enable input WE which is enabled during each write cycle to cause the four input digits to be written into the currently addressed location of the RAM.

The RAM is address by a 10-bit address AD(0-9) supplied by a multiplexer 81, controlled by the write control signal WRT. When WRT is true (i.e. in a write cycle) the multiplexer selects a write address WA(0-9) from a register 82. When WRT is false (read cycle) it selects a read address RA(0-9) from a register 83. The address AD(0-9) is incremented by one by a circuit 84 and is fed back to the inputs of the two registers 82,83.

Loading of the register 82 is controlled by an AND gate 85 which receives the internal clock CLK and an increment control signal C1INCW. As will be described later, C1INCW is produced during write cycles whenever the register files in the associated receiver 311 indicate that they have a message ready to be read into the channel buffer. This causes the write address WA to be incremented by one in each write cycle. The three least significant bits WA(7-9) of the write address are also used, as already described, to control the reading of the data from the register files in the associated receiver (see FIG. 5). Thus, it can be seen that data is read out of the register file in synchronism with the writing to the RAM 80, and successive 4-digit groups will be written into successive locations of the RAM.

Loading of the read address register 83 is controlled by an AND gate 86 which receives the clock CLK and a control signal C1INCR. As will be described later, C1INCR is produced in each read cycle whenever this channel is selected by the central switch 330 for reading out data. This causes the read address RA to be incremented by one in each read cycle so as to read out successive 4-digit groups from the RAM. The data output C1DATA of the RAM is fed to the central switch 330.

The three least significant bits AD(7-9) of the RAM address are combined in an AND gate 87 to produce a signal C1LASTAD. This indicates that the last group of four digits in a message is being addressed, and is used by the central switch 330 as will be described to initiate the selection of the next message.

As mentioned above, the channel buffer produces a request signal C1REQ when it has a message for transmission through the central switch. This signal is produced by an AND gate 88, which is enabled by the control signal C1LOC from the configuration register. Hence, C1REQ can only be generated if this node is in local mode and channel 1 is enabled.

The AND gate 88 receives the inverse of the output of a multiplexer 89, which is controlled by a mode control signal SLOWM. When SLOWM is false, the multiplexer selects the output of a comparator 810, which compares the write address WA(0-9) and read address RA(0-9). In this case, therefore, the request signal C1REQ is produced whenever WA and RA differ, i.e. whenever the RAM 80 contains any data. When SLOWM is true, the multiplexer 89 selects output of a comparator 811 which compares the most significant seven bits WA(0-6), RA(0-6) of the write and read addresses. In this case, therefore, the request signal C1REQ is produced only if the read and write addresses differ by at least eight, i.e. if the RAM 80 contains at least one complete message.

In normal operation, SLOWM is set to zero, allowing onward transmission of each message to be requested and commenced before the whole of the message has been received into the channel buffer. However, for diagnostic purposes a "slow message" mode can be entered by setting SLOWM to one. In this mode, each message must be fully received into the channel buffer before it is transmitted. This facilitates diagnostic checking and the location of faults.

The read address RA(0-9) is subtracted from the write address WA(0-9) in a subtractor circuit 812, and the most significant bit of the difference is gated with C1LOC in an AND gate 813 to produce a signal C1HFUL. This signal indicates that the RAM 80 is at least half full (64 message waiting). As will be described, it is used in the central switch 330 to give increased priority to messages from this channel.

The channel buffers 320, 322, 323 for the other channels are similar to that shown in FIG. 8, with suitable changes to the names of the signals, e.g. channel buffer 322 is controlled by C2LOC instead of C1LOC. Also, in the case of channel 0, the channel buffer 320 contains a further AND gate 814, enabled by COEN, which combines two bits of the difference from the subtractor 812. This produces a signal FULL which indicates that the buffer contains at least 80 messages.

The logic in the channel buffer 321 for producing the signal C1INCW which increments the write address register 82 will now be described.

It will be recalled that each receiver 311-313 contains five register files 560-564 which receive data from the five incoming optical fibres in the channel. Each of these register files has its own control circuit 570-574 which independently detects the message start pattern and produces a signal RFEN to initiate the loading of data into the associated register file. Since the signals on the five fibres are not necessarily in step with each other, the RFEN signals from the five control circuits do not necessarily occur simultaneously.

Referring to FIG. 9, the five RFEN signals from the receiver 311 are fed to the channel buffer 321 where they are clocked in parallel through a chain of three five-bit registers 91, 92, 93 in successive beats of the clock CLK. The output of register 92 is combined in a set of AND gates 94 with the inverse of the output of register 93 to produce a set of signals which mark any zero-to-one transitions in the respective RFEN signals. The outputs of the AND gates 94 are clocked into a 5-bit register 95, by way of OR gates 96, at the next CLK beat. The outputs of the register 95 are fed back to its inputs, by way of a set of AND gates 97 and the OR gates 96 so that, once any bit of the register has been set, it is held in that state.

The outputs of the register 95 are combined in an AND gate 98 to produce a signal UV which indicates that a transition has been detected in all five signals RFEN. This signal disables the AND gates 97 and hence resets the register 95. It can be seen that the signal UV indicates that a start pattern has now been detected on all five incoming fibres.

Assuming that the node is in local mode (LOC = 1) an AND gate 99 is then enabled, and this causes a flip-flop 910 to be set at the next CLK beat. This causes another flip-flop 911 to be set at the next again CLK beat, by way of an OR gate 912. The outputs of the flip-flops 910, 911 are combined in an OR gate 913, the output of which is combined with WRT in an AND gate 914 to produce the signal C1INCW. The output of the flip-flop 911 is also fed back to its input by way of an AND gate 915 and the OR gate 912, so as to hold it in the set state once it has been set. The flip-flop 911 will be held in this state until the signals C1LASTAD and WRT appear, enabling an AND gate 916 and disabling the AND gate 915.

Thus, it can be seen that when a start of message pattern is detected on all five fibres, UV is produced. This causes C1INCW to be produced in each write cycle. This allows the write address register 82 (FIG. 8) to be incremented in successive write cycles, so as to write successive four-digit groups from the receiver 311 into successive locations of the channel buffer 321. When the last four-digit group of the message is written, C1LASTAD causes the C1INCW signal to be removed.

Channel buffers 322 and 323 for channels 2 and 3 have similar circuits to that shown in FIG. 9. The buffer 320 for channel 0 has a simplified circuit, due to the fact that the input data is already synchronised to the clock CLK.

The receive buffer 351 is similar to the channel buffers except as follows:

(a) Writing to the buffer 351 is initiated whenever the one of the receivers 311–313 currently selected by the multiplexer 350 has a message ready. In the case where the multiplexer 350 selects the output of the central switch, writing to the buffer 351 is initiated each time the central switch selects a message for transmission.

(b) Reading from the buffer 351 is controlled by a read increment signal from the local processor, rather than from the central switch.

(c) Instead of producing a request signal to the central switch, the buffer 351 produces a "message available" signal to inform the local processor that it has a message ready.

Figure 10:
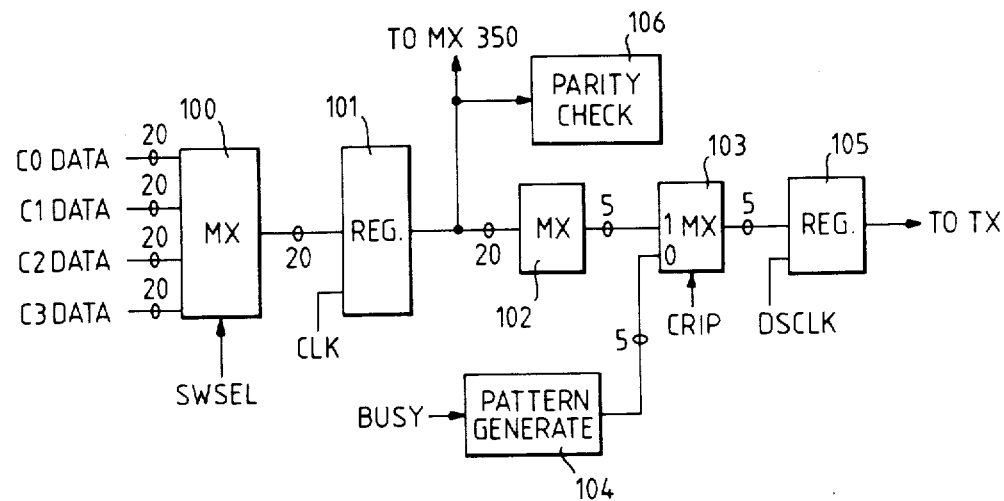
FIGS. 10-12 show a central switch forming part of the INS.
Figure 11:
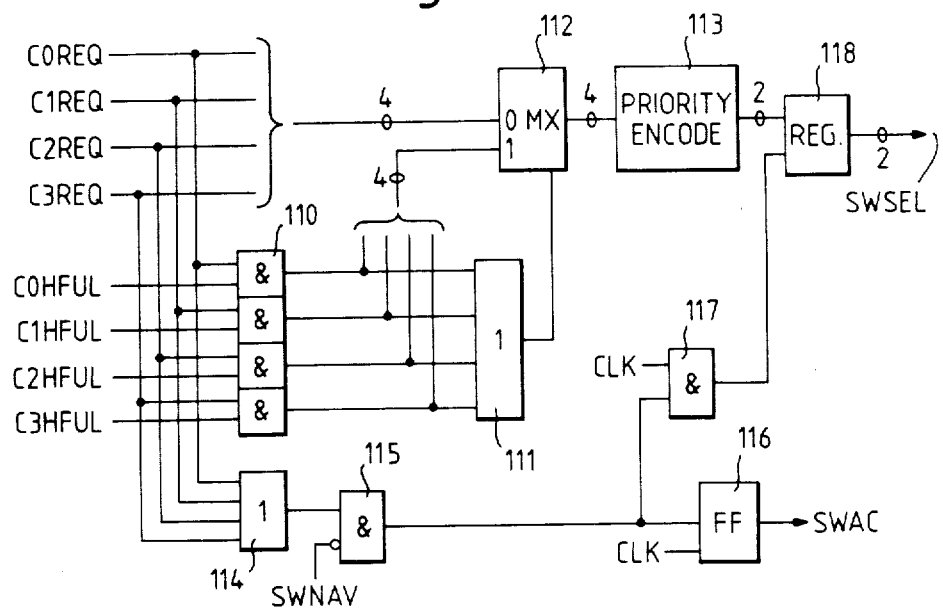
Figure 12:
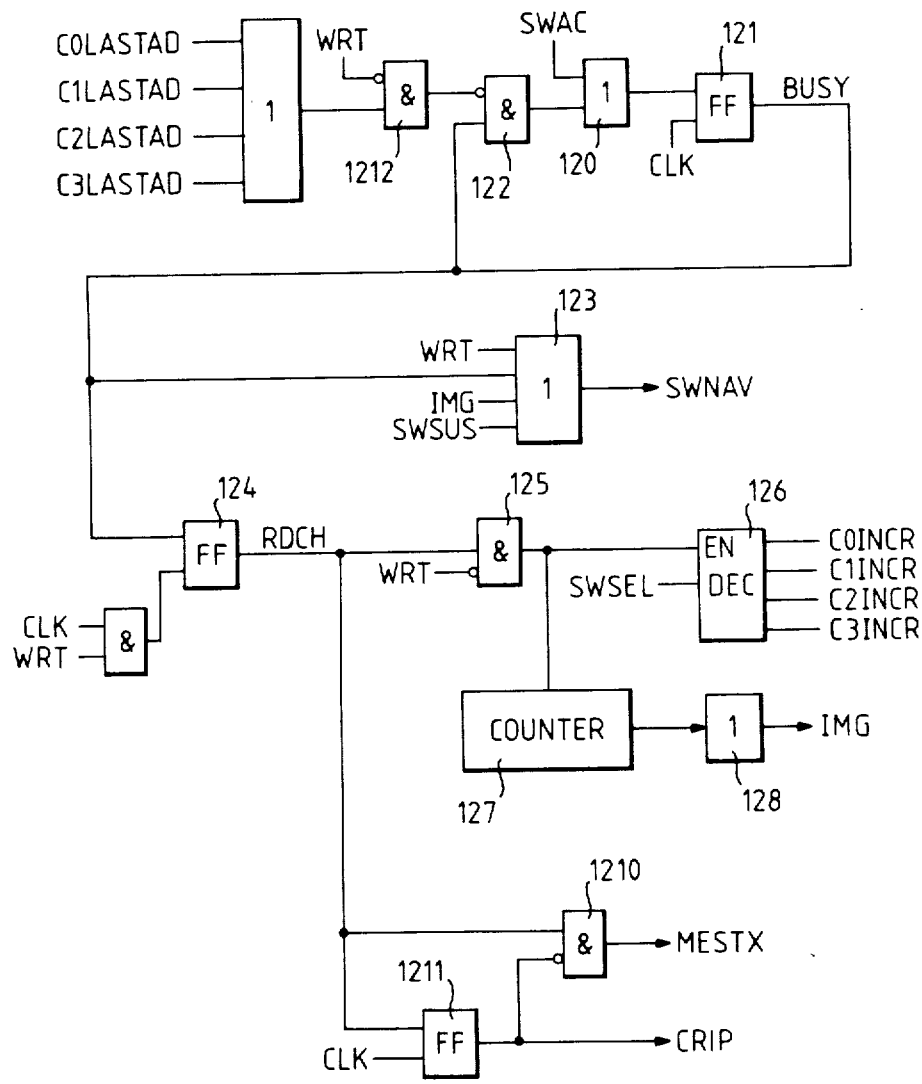

FIGS. 10–12 show the central switch 330 in detail.

Referring to FIG. 10, the switch comprises a 4:1 multiplexer 100 which receives the data signals C0DATA-C3DATA from the four channel buffers 320–324. The multiplexer is controlled by a switch select signal SWSEL, which selects one of the four input channels for connection to the output. The output of the multiplexer is clocked into a register 101 by CLK. The output of this register is fed to the receive buffer 351 via the multiplexer 350 (FIG. 3).

The output of the register 101 is also fed to a 4:1 multiplexer 102, which multiplexes the 4-digit-wide signal down to a one-digit-wide signal, at a clock rate of 80 MHz, synchronised to the double speed clock DSCLK. The output of this multiplexer is fed to a 2:1 multiplexer 103, the other input of which is connected to a pattern generation circuit 104, which produces the sychronisation pattern (1000) and start pattern (111101) for the data. The output of the multiplexer 103 is clocked into a register 105 by DSCLK, and is then fed to the three transmitters 341–343 for transmission over the output paths XCH1–XCH3.

The output of the register 101 is also fed to a parity checking circuit 106 which checks the digit parity of all messages passing through the central switch.

Referring now to FIG. 11, the central switch receives the request signals C0REQ-C3REQ from the four channel buffers 320–324, indicating whether these buffers have messages ready for transmission. It also receives the signals C0HFUL-C3HFUL from the channel buffers indicating whether the buffers are half full. The request signals are combined with the respective half-full signals in a set of AND gates 110. The outputs of these gates are then combined in an OR gate 111 to produce a control signal for a 2:1 multiplexer 112. When this control signal is false, the multiplexer selects the request signals; when it is true, it selects the outputs of the AND gates 110.

The four-bit output of the multiplexer 112 is fed to a priority encoder 113 which selects the highest priority true input. Each time a selection is made, the priority is changed cyclically: for example, if the order of priority of the inputs is initially 0, 1, 2, 3, after a selection is made the order of priority is changed to 1, 2, 3, 0.

It can be seen that if none of the channel buffers is half-full, the selection is made among all the requesting channels. However, if any of the channel buffers is half-full, the selection is restricted to those buffers.

The signals C0REQ-C3REQ are also combined in an OR gate 114 and this enables an AND gate 115, provided that a signal SWNAV (switch not available) is not true. This causes a flip-flop 116 to be set at the next CLK beat, producing a signal SWAC (switch accept) which, as will be described, initiates the transfer of the message from the selected channel buffer through the central switch. Also, at the same CLK beat, an AND gate 117 is enabled, which loads the output of the priority encoder 113 into a 2-bit register 118. This provides the SWSEL signal for the multiplexer 100.

Referring to FIG. 12, the switch accept signal SWAC enables an OR gate 120, which sets a flip-flop 121 at the next CLK beat. This produces a BUSY signal indicating that the central switch is now busy handling a message. The BUSY signal is fed back to the input of the flip-flop 121 by way of an AND gate 122 and the OR gate 120 so as to hold it in its set state.

The BUSY signal is applied to the pattern generation circuit 104 (FIG. 10) causing it to stop generating the synchronisation pattern 1000 (which it was doing while no message was being transmitted) and instead to generate the start of message pattern 111101 on each of its five output lines.

Referring still to FIG. 12, the BUSY signal is applied to one input of an OR gate 123, the output of which provides the switch not available signal SWNAV. This disables the AND gate 115 (FIG. 11) and hence prevents the switch from accepting any further messages while this message is being handled.

The BUSY signal also sets another flip-flop 124 two beats later at the end of the next write cycle, producing a signal RDCH. This enables an AND gate 125 in each read cycle (WRT=0) and this in turn enables a decoder 126 which decodes the switch selection signal SWSEL to produce the read increment signal C0INCR-C3INCR for the selected channel. As described above with reference to FIG. 8, the read increment signal allows the read address register 83 in the channel buffer to be incremented in each read cycle, and hence causes a succession of four-digit groups to be read out of the selected channel.

The output of the AND gate 125 also sets a counter 127 to a preset value, representing the desired inter-message gap, i.e. the minimum number of clock beats between adjacent messages. The contents of this counter are combined in an OR gate 128 to produce a signal IMG if the counter is non-zero. This signal is fed to another input of the OR gate 123 so as to maintain SWNAV until the end of the inter-message gap.

The signal RDCH also enables an AND gate 1210 producing a signal MESTX. This increments the three ACK counters 361–363. At the next CLK beat, RDCH sets a flip-flop 1211, producing a signal CRIP which disables the AND gate 1210, removing MESTX.

Referring again to FIG. 10, the signal CRIP switches the multiplexer 103 so that it now selects the message data from the multiplexer 100 instead of the output of the pattern generation circuit 104.

When the last group of digits of the message is read out from the channel buffer, one of the signals C0LASTAD-C3LASTAD is produced during a read cycle. This enables an AND gate 1212, which disables the AND gate 122, resetting the flip-flop 121. Thus, the BUSY signal is removed which in turn removes RDCH and CRIP. The removal of CRIP switches the multiplexer 103 (FIG. 10) back to its original state so that it selects the synchronisation attern 1000 from the circuit 104 for transmitting during the inter-message gap. The removal of RDCH frees the counter 127, so that it can now start counting down so as to time the inter-message gap. When the counter reaches zero, IMG is removed, which in turn removes SWNAV, allowing the central switch to select another message.

Figure 13:
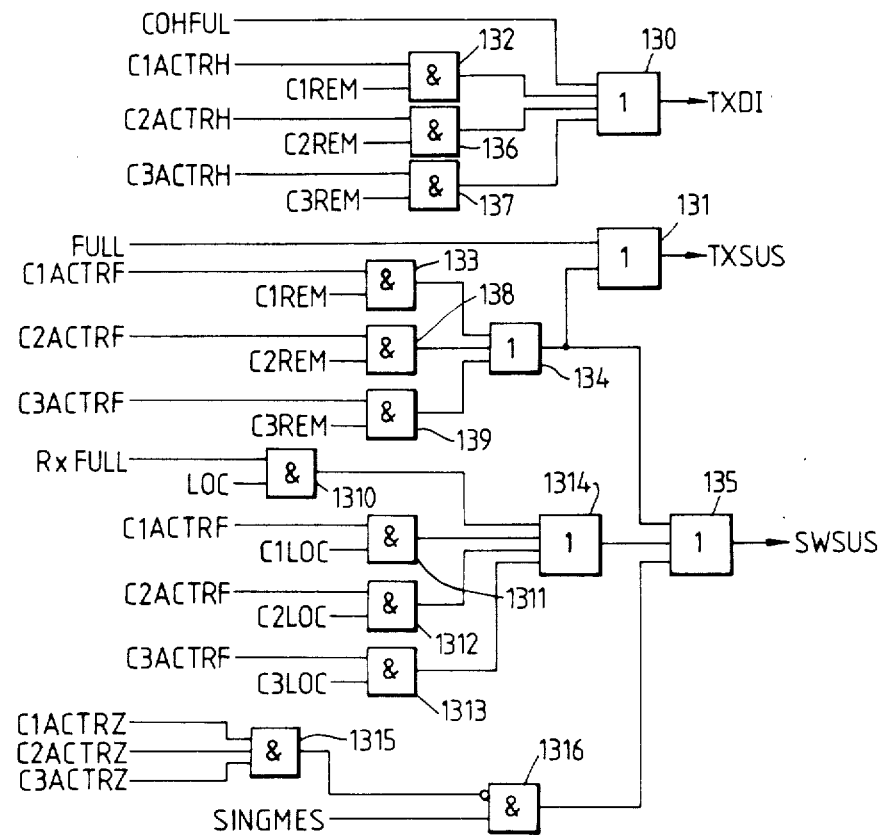
FIG. 13 shows the way in which interrupt signals are generated by the INS.

As described above, when the channel 0 buffer 320 becomes half-full, it generates the signal C0HFLL. Referring to FIG. 13, this signal enables an OR gate 130, producing a delayed interrupt signal TXDI requesting the local processor not to produce any more messages. If the processor ignores this interrupt and the number of messages in the buffer 320 continues to increase, it will eventually produce the signal FULL. This enables an OR gate 131, producing an immediate interrupt signal TXSUS which stops the processor sending any more messages. This ensures that the channel 0 buffer never overflows.

Consider now the case where the node is in remote mode, the active INS being connected to channel 1; i.e. C1REM = 1. In this case, the channel 1 ACK counter 361 contains an approximate count of the number of messages that have been sent by this node to the active INS but have not yet been read out of the corresponding channel buffer in the active INS. If the ACK counter reaches a count of 64, it produces a signal C1ACTRH which indicates that the buffer in the active INS is approximately half-full. This signal enables an AND gate 132 which in turn enables the OR gate 130, producing the delayed interrupt signal TXDI for the local processor. If the ACK counter reaches a count of 80, it produces a signal C1ACTRF which indicates that the buffer in the active INS is now nearly two-thirds full. This enables an AND gate 133 which in turn enables an OR gate 134 and the OR gate 131, producing the immediate interrupt TXSUS. The OR gate 134 also enables another OR gate 135, producing a signal SWSUS which, as shown in FIG. 2, produces the signal SWNAV which disables the central switch.

As shown in FIG. 13, TXDI, TXSUS and SWSUS are produced in a similar way, by means of AND gates 136-139, when the active INS is in the node connected to channel 2 or 3 instead of channel 1.

SWSUS can also be generated when the node is in local mode, by means of AND gates 1310-1315 and OR gate 1314 if the receive buffer 351 becomes nearly full, as indicated by the signal RXFULL, or if the receive buffer in one of the other nodes becomes nearly full, as indicated by signals C1ACTRF-C3ACTRF from the ACK counters.

Each ACK counter also produces a signal C1ACTRZ-C3ACTRZ when its count is zero. These signals are combined in an AND gate 1315, the inverse of which is fed to one input of an AND gate 1316. The other input of the gate 1316 receives a mode control signal SINGMES. The output of the gate 1316 is applied to the OR gate 135 which produces SWSUS. Normally, SINGMES=0. However, in a "single message" mode of operation, SINGMES is set to "1". It can be seen that, in this mode, the central switch is suspended unless all the ACK counts are at zero. This ensures that the node can have only one message in transit at a time, which is useful for diagnostic purposes.

Figure 14:
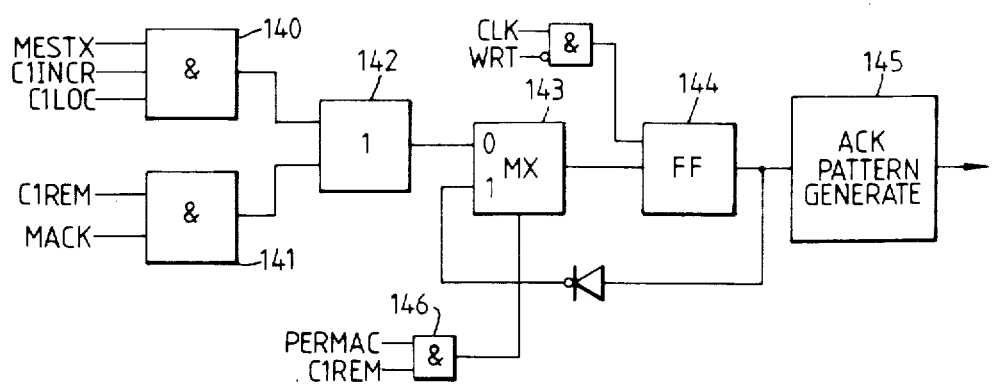
FIG. 14 shows an acknowledgement generation circuit forming part of the INS.

Referring to FIG. 14, this shows the channel 1 ACK generation circuit 381 in detail; the other circuits 382, 383 are similar.

The circuit comprises an AND gate 140 which receives:

(a) the signal MESTX which indicates that a message is being transmitted through the central switch;

(b) C1INCR which indicates that the central switch has selected channel 1; and (c) C1LOC which indicates that this is the currently active INS and channel 1 is enabled.

Another AND gate 141 receives:

(a) the signal C1REM, which indicates that this node is in remote mode and that channel 1 is the one which is connected to the currently active INS; and (b) a signal MACK which indicates that a message has been read by the processor from the receive buffer 351.

The outputs of the AND gates are combined in an OR gate 142, which is connected by way of a multiplexer 143 the data input of a flip-flop 144. When set, the flip-flop produces a pulse which activates an ACK pattern generation circuit 145 causing it to produce the ACK pattern 0111. Otherwise, the circuit 145 produces the synchronisation pattern 1000.

It can be seen that, when the node is in local mode, the circuit generates an ACK whenever a message is read out of the channel 1 buffer 321. When the node is in remote mode, the circuit generates an ACK whenever a message is read out of the receive buffer 351.

If a node fails while it is in remote mode, and stops taking messages from its receive buffer 351, the corresponding ACK counter in the active INS will continue to increment and would eventually suspend the entire system by means of the interrupt mechanism of FIG. 13. In order to avoid this, when the node detects a fault from which it cannot recover, it sets a mode control bit PERMAC. This, together with C1REM, enables an AND 146 which switches the multiplexer 143 so that it now selects the inverted output of the flip-flop 144. This causes the flip-flop to be set and reset alternately, producing a stream of ACK signals. These signals are returned to the node containing the active INS and decrement the corresponding ACK counter in that node to zero, holding it there. Hence, the faulty node can no longer suspend the rest of the system, which can therefore continue operating without the faulty node. The system may then be reconfigured to exclude the faulty node completely from the system.

We claim:

1. A data processing system comprising a plurality of data processing nodes each node comprising:
   (a) a data processing unit, and
   (b) a message switching unit, connected to the data processing unit in the same node and also connected to the message switching units in all the other nodes, the system also comprising:
   (i) means for selecting any one of said message switch units as a master message switching unit,
   (ii) means for operating the master switching unit in a local mode in which it acts as a star coupler for receiving messages from any of the nodes and for relying each of said messages to all the nodes, and
   (iii) means for operating each message switching unit other than the master message switching unit in a remote mode in which it relays messages between the processing unit in the same node and the master message switching unit.

2. A system according to claim 1 wherein each message switching unit includes a configuration register for controlling the modes of operation of the message switching unit.

3. A system according to claim 1 wherein each switching unit comprises a plurality of input channels, one of the input channels being connected to receive messages from the data processing unit in the same node while the other input channels are connected to receive messages from the otehr nodes, and a central switch operative to select a message from any one of the input channels, and to pass that message to all the other nodes.

4. A system according to claim 3 wherein each of said input channels comprises means responsive to receipt of a message, for sending a request signal to the central switch, and wherein the central switch comprises means for servicing each of the request signals in turn, in order of priority, by selecting a message from the corresponding channel.

5. A system according to Claim 4 wherein the means for operating the switching unit in a local mode comprises means for enabling all the input channels to send request signals to the central switch, and the means for operating the switching unit in a remote mode comprises means for enabling only the input channel connected to the data processing unit in the same node to send request signals to the central switch.

6. A system according to Claim 5 wherein each switching unit also includes a multiplexer having a first input connected to the output of the central switch and other inputs connected to said other input channels, the output of the multiplexer being connected to the data processing unit in the same node, wherein the means for operating the switching unit in the local mode comprises means for setting the multiplexer to select its first input, and the means for operating the switching unit in the remote mode comprises means for setting the multiplexer to select the input channel connected to said selected one of the other switching units.

7. A system according to Claim 3 wherein each of the input channels has buffer means for holding a queue of messages which messages are waiting to be selected by the central switch.

* * * * *